(12) United States Patent
Zhou et al.

(10) Patent No.: US 9,116,237 B2
(45) Date of Patent: Aug. 25, 2015

(54) PHASE-BASED RANGING FOR BACKSCATTER RFID TAGS

(71) Applicant: Disney Enterprises, Inc., Burbank, CA (US)

(72) Inventors: Chenming Zhou, Pittsburgh, PA (US); Joshua D. Griffin, Pittsburgh, PA (US)

(73) Assignee: DISNEY ENTERPRISES, Burbank, CA (US)

( * ) Notice: Subject to any disclaimer, the term of this patent is extended or adjusted under 35 U.S.C. 154(b) by 290 days.

(21) Appl. No.: 13/732,405

(22) Filed: Jan. 1, 2013

(65) Prior Publication Data

US 2014/0184447 A1    Jul. 3, 2014

(51) Int. Cl.
*G01S 13/34* (2006.01)
*G01S 13/84* (2006.01)

(52) U.S. Cl.
CPC ..................................... *G01S 13/84* (2013.01)

(58) Field of Classification Search
CPC ....... G01S 13/84; G01S 13/34; G01S 13/345; G01S 7/352
USPC .................................................. 342/109, 118
See application file for complete search history.

(56) References Cited

U.S. PATENT DOCUMENTS

| 7,180,421 | B2 | 2/2007 | Pahlaven et al. |
| 7,580,378 | B2 | 8/2009 | Carrender et al. |
| 8,063,760 | B2 | 11/2011 | Volpi et al. |
| 8,063,769 | B2 | 11/2011 | Rofougaran |
| 8,089,344 | B1 | 1/2012 | Zand |
| 2006/0284727 | A1 | 12/2006 | Steinke |
| 2007/0159338 | A1 | 7/2007 | Beber et al. |
| 2009/0160603 | A1 | 6/2009 | Bauchot et al. |
| 2010/0109844 | A1 | 5/2010 | Carrick et al. |
| 2010/0156651 | A1 | 6/2010 | Broer |
| 2011/0169607 | A1 | 7/2011 | Paulson |
| 2011/0260910 | A1 | 10/2011 | Gravelle et al. |
| 2012/0050016 | A1 | 3/2012 | Bieber et al. |
| 2013/0038428 | A1* | 2/2013 | Viikari et al. ................ 340/10.4 |

OTHER PUBLICATIONS

Azzouzi, Salah et al, New Measurement Results for the Localization of UHF RFID Transponders Using an Angle of Arrival (AoA) Approach, IEEE International Conference on RFID, Apr. 2011, IEEE, Piscataway, United States.

(Continued)

*Primary Examiner* — Timothy A Brainard
(74) *Attorney, Agent, or Firm* — Patterson & Sheridan, L.L.P.

(57) ABSTRACT

A RF tag reader may use spatial averaging to compensate for the limitations of performing multi-frequency continuous-wave ranging (MFCW) in a bandwidth-limited environment. Although MFCW provides an estimate of the separation distance between a RF tag and the tag reader with errors that vary widely, the error values form a pattern based on the separation distance. That is, as the separation distance increases or decreases, the error values oscillate between maximum and minimum values centered on the correct separation distance. Accordingly, in one embodiment, the receiver uses spatial averaging to average out this oscillating error (e.g., the maximum errors are counter-balanced by the minimum errors). The more accurate, spatially-averaged MFCW estimate may then be used to resolve the cycle ambiguity in continuous-wave ranging to identify the separation distance between the RF tag and the tag reader.

20 Claims, 6 Drawing Sheets

(56) References Cited

OTHER PUBLICATIONS

Wille, Andreas et al., Phase Difference Based RFID Navigation for Medical Applications, IEEE International Conference on RFID, Apr. 2011, IEEE, Piscataway, United States.

Ledeczi, Akos, Towards Precise Indoor RF Localization, Proceedings of the 5th Workshop on Embedded Networked Sensors, 2008, HotEmNets, Los Angeles, United States.

Nikitin, Pavel V. et al., Phase Based Spatial Identification of UHF RFID Tags, IEEE International Conference on RFID, Apr. 2010, IEEE, Piscataway, United States.

Hekimian-Williams, Cory et al., Accurate Localization of RFID Tags Using Phase Difference, IEEE International Conference on RFID, Apr. 2010, IEEE, Piscataway, United States.

Li, Xin et al., Multifrequency-Based Range Estimation of RFID Tags, IEEE International Conference on RFID, Apr. 2009, IEEE Piscataway, United States.

Kim, Donghyun et al., GPS Ambiguity Resolution and Validation: Methodologies, Trends and Issues, 7th GNSS Workshop-International Symposium on GPS/GNSS, Nov. 2000, The Korean GNSS Society, Seoul, Korea.

Arnitz, Daniel et al., Multifrequency Continuous-Wave Radar Approach to Ranging in Passive UHF RFID, IEEE Transactions on Microwave Theory and Techniques, May 2009, vol. 57, No. 5, IEEE, Piscataway, United States.

T. Xiong et al., "Design and implementation of a passive UHF RFID-based real time location system," Proceedings of the 2010 IEEE Int. Symp. on VLSI Design Automation and Test (VLSI-DAT), Apr. 2010, pp. 95-98, Piscataway, United States.

J. Heidrich et al., "Local positioning with passive UHF RFID transponders," Proceedings of the IEEE MTT-S Int. Microwave Workshop on Wireless Sensing,Local Positioning, and RFID, (IMWS 09), 2009, pp. 1-4, Piscataway, United States.

Li, Xin et al., Multifrequency-Based Range Estimation of RFID Tags, 2009 IEEE International Conference on RFID, May 2009, pp. 147-154, IEEE, Piscataway, United States.

Zhou, Chenming, A Shoe to Shoe RF Ranging Sensor for Aiding Inertial Navigation, 2011 IEEE Vehicular Technology Conference, Sep. 2011, pp. 1-5, IEEE, Piscataway, United States.

\* cited by examiner

PHASE-BASED RANGING FOR BACKSCATTER RFID TAGS

BACKGROUND

1. Field of the Invention

Embodiments presented in this disclosure generally relate to identifying a location of an RF tag and, more specifically, to determining a range of the tag using continuous wave radar.

2. Description of the Related Art

Typical radio frequency identification (RFID) tags or RF tags include a microprocessor functionally connected to an antenna. The microprocessor stores and processes relevant data that may include unique data for identifying a specific item associated with the RF tag. The microprocessor also modulates a radio frequency (RF) signal that is transmitted or backscattered via the antenna. An external tag reader captures the data signal transmitted by the RF tag.

RF tags can be classified as "active" or backscatter devices. Active tags use an internal power source to actively transmit a modulated signal to the tag reader. Backscatter tags, in contrast, do not actively transmit modulated signals to the tag reader but modulate the electromagnetic waves scattered from the tag's antenna. The signal that is scattered originates from the tag reader. Backscatter tags can be classified as "passive" (without any onboard power source) or "semi-passive" (includes an internal power source but still communicates with the tag reader via modulated backscatter and does not actively transmit a signal to the tag reader). Passive RF tags are powered by the incident signal transmitted by the tag reader. Passive and semi-passive tags are typically less expensive than active tags but have shorter functional ranges than active RF tags. Backscatter tags typically operate in the ultra-high frequency (UHF) or microwave frequency bands.

In some cases, the external tag reader may be configured to determine the distance between the reader and the RF tag. Conventional ranging techniques, such as received signal strength (RSS) for either active or passive RF tags, work over relatively large areas but suffer from poor accuracy. Time of flight or frequency modulated continuous wave radar may also be used to determine the separation distance but these techniques work poorly for short distance applications because of the difficulties of measuring the small round trip time or frequency delay. Instead RF phase-based ranging techniques are preferred when high accuracy is required.

SUMMARY

One embodiment of the present disclosure is a method of performing phase-based ranging techniques. The method includes estimating a plurality of first distances between a RF tag and an RF tag reader using a continuous-wave (CW) ranging technique and estimating a plurality of second distances between the RF tag and the RF tag reader using a multi-frequency continuous-wave (MFCW) ranging technique. The method includes performing spatial averaging based on the pluralities of first and second distances to mitigate the effects of an error associated with the plurality of second distances.

Another embodiment of the present disclosure is a RF tag reader. The tag reader includes an antenna and CW logic configured to estimate a plurality of first distances between a RF tag and the antenna using a CW ranging technique and MFCW logic configured to estimate a plurality of second distances between the RF tag and the antenna using a MFCW ranging technique. The tag reader includes spatial averaging logic configured to perform spatial averaging based on the pluralities of first and second distances to mitigate the effects of an error associated with the plurality of second distances.

Another embodiment of the present disclosure is a RF receiver. The receiver includes an antenna and CW logic configured to estimate a plurality of first distances between a RF transmitter and the antenna using a CW ranging technique and MFCW logic configured to estimate a plurality of second distances between the RF transmitter and the antenna using a MFCW ranging technique. The RF receiver also includes spatial averaging logic configured to perform spatial averaging based on the pluralities of first and second distances to mitigate the effects of an error associated with the plurality of second distances.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
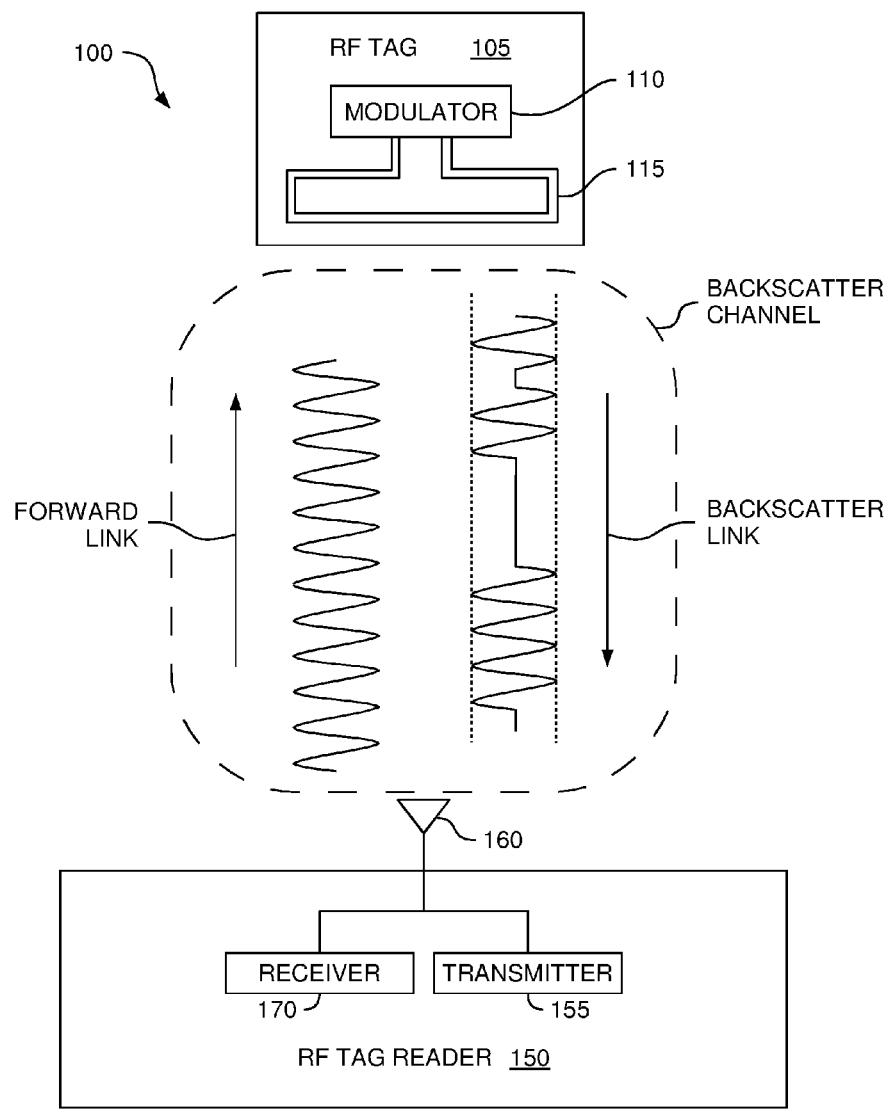
FIG. 1 is an RFID system, according to one embodiment disclosed herein.

Identifying a distance between a RF tag and a receiver antenna of a RF tag reader (referred to herein as a "separation distance") may include combining different phase-based ranging techniques. However, the different ranging techniques come with different advantages and disadvantages. Continuous-wave (CW) radar offers up to millimeter precision but suffers from cycle ambiguity (i.e., the measured distance is based on a wrapped phase rather than an unwrapped phase). Multi-frequency continuous-wave (MFCW) radar, on the other hand, estimates the separation distance using the difference between two wrapped phases, which results in a distance measurement that does not have a cycle ambiguity as long as the distance is less than the MFCW ambiguity distance. However, the MFCW estimated distance may be too inaccurate for certain uses. Instead of relying on only one of the ranging techniques, in one embodiment, the CW and MFCW techniques are used in tandem. Specifically, the tag reader may include logic that performs MFCW ranging to determine an estimated distance that can be used to resolve the cycle ambiguity of the CW radar. Once the cycle ambiguity is resolved, the tag reader may use the CW technique to determine the separation distance with high accuracy (within millimeters).

To perform MFCW ranging, at least two unmodulated, periodic signals are propagated from a transmitter of the RF tag reader to a RF tag. In response, the RF tag transmits additional signals back to the RF tag reader which measures the phase difference between the signals received at each frequency to estimate the separation distance. However, the error of this estimated distance depends on the frequency spread between the two unmodulated signals. For example, if the transmitter propagates two sinusoidal signals with frequencies of 5.875 GHz and 5.725 GHz, the frequency spread is 150 MHz. As will be explained later, the error decreases as the frequency spread increases. However, increasing the frequency spread requires additional available bandwidth. In some embodiments, the available bandwidth may be limited. For example, the Federal Communication Commission (FCC) may limit the available bandwidth to the range of 5.725-5.875 GHz, and thus, the maximum frequency spread is 150 MHz. Because of the bandwidth limitations, MFCW may be unable to accurately resolve the cycle ambiguity in order to determine the separation distance using CW ranging.

In one embodiment, the receiver uses spatial averaging to compensate for the limitations of performing MFCW in a bandwidth-limited environment. Although MFCW provides an estimate of the separation distance with errors that vary widely, the error values form a pattern relative to the separation distance. That is, the error values oscillate between maximum and minimum values around the correct separation distance as the separation distance changes. Accordingly, in one embodiment, the receiver uses spatial averaging to average out this oscillating error. Assume for example that the RF tag is located on a wrist of a user while the receiver antenna is at a fixed location. As the user moves her wrist, the separation distance also varies. If the receiver performs spatial averaging, this mitigates the overall error (e.g., the maximum errors are counter-balanced by the minimum errors) and provides a more accurate MFCW ranging estimate. In this manner, the receiver may use spatial averaging to lessen the negative effects of performing MFCW ranging in a bandwidth limited environment. The MFCW estimate may then be used to resolve the cycle ambiguity in CW ranging to more accurately identify the separation distance relative to using MFCW or CW ranging alone.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an RFID system, according to one embodiment of the invention. The RFID system 100 includes an RF tag reader 150 and an RF tag 105. The tag reader 150 includes at least one antenna 160 coupled to at least one of a receiver 170 or transmitter 155. The tag reader 150 may either operate in either monostatic mode—i.e., the antennas coupled to the reader are configured to both transmit a signal to, and receive a signal from, the RF tag—or bistatic mode—i.e., the antennas are configured to either transmit a signal to or receive a signal from the RF tag but not both. For example, the tag reader 150 may include an interface connected (via a wire or wirelessly) to the antennas 160 which permits the tag reader 150 to communicate with the antennas 160. Although not shown in FIG. 1, each antenna of a bistatic tag reader 150 may be coupled to either the transmitter 155 or receiver 170 but not both.

The RF tag 105 includes a modulator 110 and an antenna 115. The antenna 115 may both receive the signal transmitted by the antenna 160 of the tag reader 150 and transmit or backscatter a modulated signal back to the tag reader 150. In one embodiment, the transmitted signal of the tag reader 150 energizes the modulator 110 which then modulates and backscatters a signal (using the antenna 115) back to the tag reader 150. The modulator 110 may use any modulation scheme such as amplitude shift keying (ASK), on-off keying (OOK), phase shift keying (PSK), and the like to encode information on a carrier signal.

In one embodiment the RF tag 105 is used in RFID. Here, the modulator 110 uses a modulation scheme to encode a carrier signal with an identification code (e.g., 127 bytes) that is associated with the tag 105. Once the tag reader 150 receives the modulated signal, it can convert down to baseband (i.e., remove the carrier signal) and detect the identification code. For example, the identification code may be modulated at 1.25 MHz onto a carrier frequency of 5.82 GHz.

The RF tag 105 may be an active, passive, or semi-passive RF tag. An active RF tag 105 uses its own power source to receive a signal from the tag reader 150 and transmit a modulated signal back to the tag reader 150. That is, an active tag 105 does not use backscattering to transmit a signal to the tag reader 150. A semi-passive RF tag 105 may have its own power source but it does not use this source to broadcast the modulated, backscattered signal to the tag reader 150. A passive RF tag 105 lacks any kind of internal power source. The RFID system 100 is not limited to only one type of RF tag 105 but may use a combination of RF tags simultaneously. For all the embodiments discussed herein, any type of RF tag may be used unless stated otherwise. Alternatively, the RFID system 100 may exclude certain RF tags and use, for example, only passive or semi-passive backscattering RF tags 105 to communicate with the tag reader 150. In one embodiment, the present embodiments may be implemented on a one or more backscatter RF tags, surface acoustic wave (SAW) RF tags, and the like. As used herein, "transmitting" a modulated signal from the RF tag to the tag reader implies using an active RF tag while "backscattering" or "scattering" implies using a passive or semi-passive RF tag to modulate the received signal.

The forward link of the backscatter channel is illustrated by the arrow pointing towards the RF tag 105. The forward link is the path followed by the transmitted signal from the antenna 160 that is received by the RF tag 105. In an environment that includes multipaths, the forward link would include all the different paths used by the multipaths emitting from a single antenna 160. As shown, the tag reader 150 may transmit an unmodulated signal to the RF tag 105 which is then modulated by the modulator 110.

The backscatter link is illustrated by the arrow pointing towards the tag reader 150. The backscatter link is the path followed by the modulated signal from the RF tag 105 to the antenna 160 of the RF tag reader 150. The signal shown in the backscatter link of FIG. 1 shows a carrier signal that may be modulated based on PSK, ASK, OOK, and the like. The encoded data may include, for example, the identification code associated with the RF tag 105. The backscatter link includes all the paths traversed by the modulated signal from the RF tag 105 to the one or more antennas 160 of the tag reader 150. The forward and backscatter links are, in combination, referred to as the backscatter channel.

Although FIG. 1 illustrates a monostatic configuration, in other embodiments, the tag reader 150 may be a bistatic configuration where the antennas are configured to either transmit a signal to or receive a signal from the RF tag. When using phase-based ranging techniques to determine the distance between the tag reader 150 and the RF tag 105, the tag reader 150 may be configured to resolve the distance between the receive and transmit antennas.

Continuous-Wave Radar

One example of a phase-based ranging technique to determine distance between a transmitter and a receiver is CW radar. Generally, CW radar determines a distance in a transmitter-to-receiver channel by measuring the phase difference between the transmitted and received signals at the reader. However, this result may be ambiguous since CW processing yields a wrapped phase instead of an unwrapped phase. Unwrapped phases can take any value, but a wrapped phase is limited to the range −180 to +180 degrees. Most coherent radio receivers are only capable of measuring wrapped phases; hence, phase-based distance measurements must resolve the unknown number of 360 degree cycles that the signal has experienced as it has propagated from the transmitter to the receiver. Here, the unwrapped phase is equivalent to the total phase generated by the signals propagating in the backscatter channel (i.e., from the antenna to the RF tag 105 and back to the antenna). Examples of an unwrapped phase may be 90 degrees, 400 degrees, 900 degrees, etc. However, using the CW technique determines distance based on the wrapped phase which is limited to −180 to +180 degrees (360 degrees total). Because the phase repeats every 360 degrees, or $2\pi$ radians, a measured wrapped phase $\hat{\theta}$ is related to an unwrapped phase $\bar{\theta}$ by:

$$\hat{\theta} = \bar{\theta} \pm 2k\pi, \text{ where } k=0,1,2,\ldots \quad (1)$$

Figure 2:
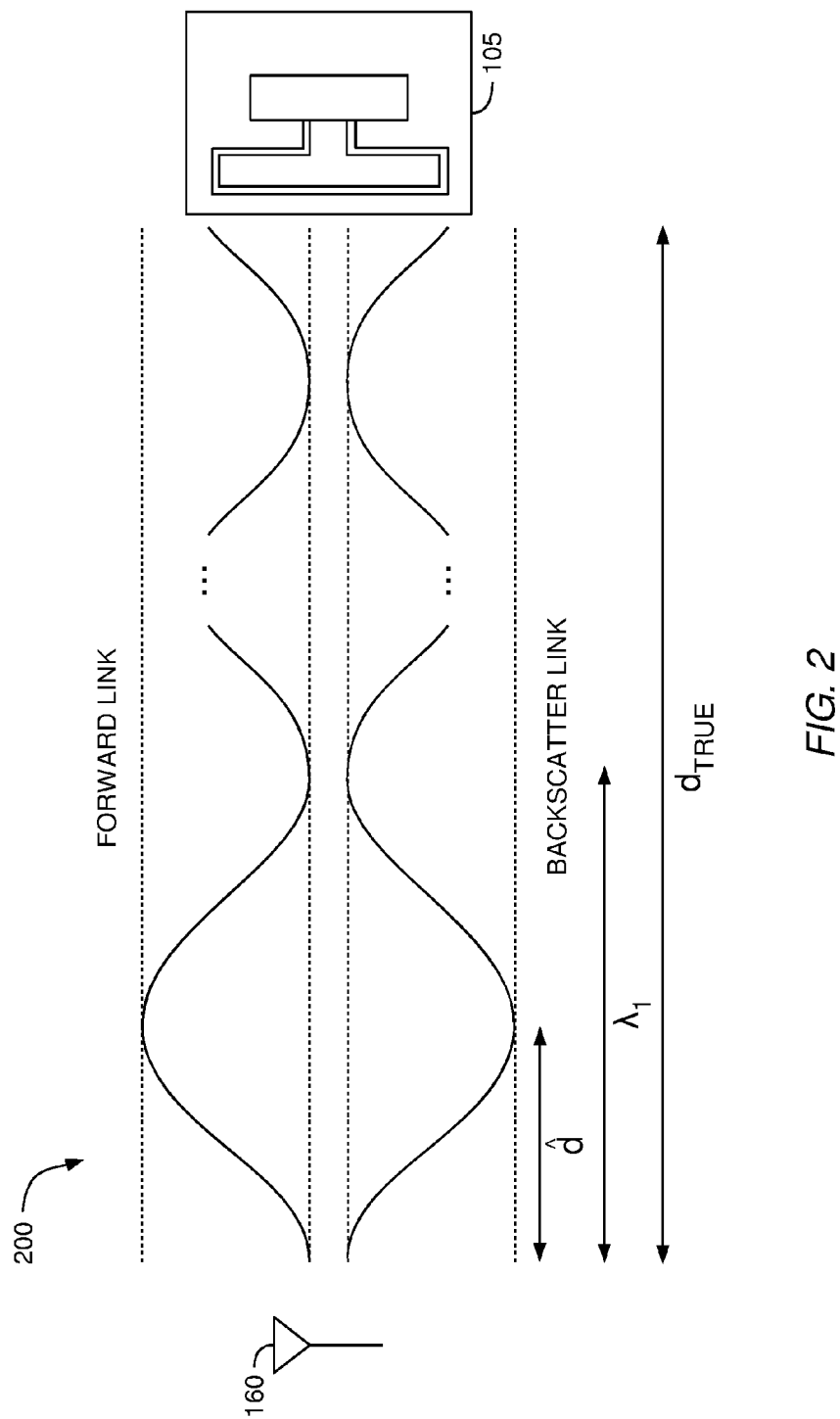
FIG. 2 illustrates a backscatter link of a backscatter channel, according to one embodiment disclosed herein.

FIG. 2 illustrates a backscatter link of a backscatter channel, according to one embodiment disclosed herein. Specifically, system 200 of FIG. 2 illustrates the limitations of using only CW techniques for identifying a distance between a transmitter (e.g., antenna 160) and the RF tag 105. When the tag reader (not shown) subtracts the phase of the signal transmitted in the forward link from the phase of the signal received in the backscatter link (where any modulation added by the RF tag 105 has been omitted for clarity), the phase difference as shown is approximately 180 degrees. Thus, each link contributes a 90 degree offset to the total phase difference ($\hat{\theta}$) in the backscatter channel. The measured CW distance ($\hat{d}$) based on the link phase offset is then found by using the phase difference and the wavelength as shown by:

$$\hat{d} = \lambda_1 \cdot \frac{\hat{\theta}}{4\pi} \quad (2)$$

In equation 2, the phase difference is divided in half to yield the phase difference caused by only one of the links of the backscatter channel, and thus, the distance $\hat{d}$ caused by the offset in one of the links. However, the distance $\hat{d}$ yielded by CW may be ambiguous if the total distance between the antenna 160 and the RF tag 105 is greater than one half of a wavelength. That is, because CW radar only determines the distance of the phase difference in each link, this technique does not determine how many wavelengths the wave propagated in the entire channel. Thus, the distance yielded by equation 1 (i.e., CW radar) is referred to herein as an "ambiguous distance" since it may be off by $k*\lambda/2$ where k is any positive integer. The k value is the total number of wavelengths, beyond the first, that the wave travels in the backscatter channel—i.e., the combined distance in both the forward link and the backscatter link. Dividing k by two yields the portion of that distance attributable to the backscatter link. Thus, the true distance ($d_{true}$)—i.e., the total distance of the backscatter link—is shown by:

$$d_{true} = \hat{d} + k\frac{\lambda_1}{2} \quad (3)$$

Accordingly, without knowing the value of k for a particular backscatter channel, performing the CW technique by evaluating only the phase difference between the transmitted and received signal using equation 2 may lead to an erroneous result. Nonetheless, once k is known, equation 3 may be used to provide an accurate (up to millimeter precision) distance estimate. For example, assume the receiver hardware of the tag reader has an error of 10% of the wavelength. For a CW radar that uses a 5.8 GHz signal with a wavelength of approximately 50 mm, the receiver can accurately determine the distance with an error of only +/−5 mm.

Multiple Frequency CW Radar

MFCW radar is an expansion of CW radar which performs a similar technique as CW except over multiple frequencies. MFCW ranging differs from CW ranging, however, because MFCW ranging provides an unambiguous estimate of the separation distance. MFCW ranging provides an unambiguous distance estimate by taking the difference between the phase of the signals received from the RF tag on a plurality of different frequencies. The phases measured at the plurality of frequencies may be wrapped, but the cycle ambiguity is removed by calculating the difference between the different frequencies. In one embodiment, the distance between the RF tag reader and RF tag is less than the ambiguity distance of the MFCW radar. Moreover, the embodiments discussed herein mention specifically determining the distance of a backscatter link using dual-frequency continuous wave (DFCW) radar, but are not limited to such. The present disclosure contemplates using any number of frequencies to determine distances in a backscatter channel. Moreover, in one embodiment, the MFCW radar is used in an environment where the line-of-sight signal dominates multiple signals.

Figure 3:
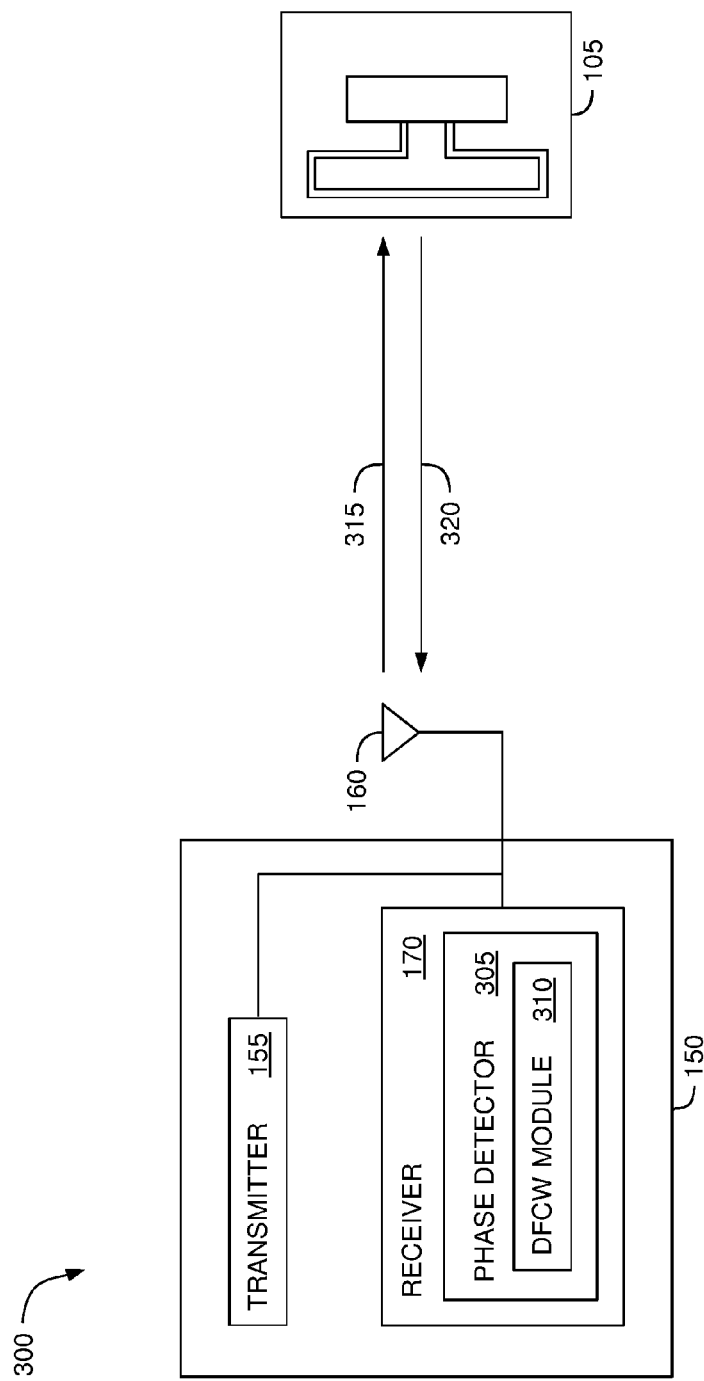
FIG. 3 is a RFID system configured to perform continuous wave ranging, according to one embodiment disclosed herein.

FIG. 3 is a RFID system configured to perform continuous wave ranging, according to one embodiment disclosed herein. Specifically, the system 300 is configured to perform a MFCW such as DFCW. For example, the transmitter 160 transmits two unmodulated signals using antenna 160. Although FIG. 3 illustrates using a sinusoidal signal, DFCW may be performed using any periodic signal—e.g., a square wave, sawtooth, and the like. The two signals may be transmitted in the forward link 315 either simultaneously or in a time duplex manner (i.e., transmitting the signals during different time periods). In response, the RF tag 105 transmits or backscatters corresponding modulated signals in the backscatter link 320. The receiver 170 identifies the signals corresponding to the RF tag 105 using the ID modulated onto the signals. In one embodiment, the receiver 170 demodulates the signals (i.e., returns the signals to unmodulated carrier signals) by, for example, employing a matched filter and uses the phase detector 305 to compare the phases of the signal received on the backscatter link 320 at each frequency. The phase detector 305 may be implemented using hardware, software, firmware, or any combination thereof.

Generally, the phase detector performs the CW technique for both signals. That is, the phase detector 305 determines a wrapped phase for each of the at least two unmodulated signals transmitted by the transmitter 155. The phase detector 305 may then use the DFCW module 310 to determine an unambiguous distance by subtracting the wrapped phases and solving for $d_{true}$ as shown by equation 2. This process leads to:

$$d_{true} = \left[\frac{\check{\theta}_2 - \check{\theta}_1}{2\pi} + \check{k}\right] \cdot \frac{\lambda_{\Delta f}}{2} \quad (4)$$

where subscript "1" represents the values associated the first unmodulated signal transmitted by the transmitter 155 and subscript "2" represents the values of the second unmodulated signal. The variables $\check{\theta}_2$ and $\check{\theta}_1$ are the normalized measurement phase for the first and second signals (which may be measured during a calibration stage) while $\check{k}$ equals $k_2 - k_1$ and represents the normalized integer k—i.e., the difference between the number of wavelengths each signal travels in the backscatter channel. The variable $\lambda_{\Delta f}$ is equal to $c/f_2 - f_1$ where c is the speed of light and $f_2$ and $f_1$ are the frequencies of the first and second unmodulated signals. The wavelength $\lambda_{\Delta f}$ is the wavelength of the sinusoid resulting from subtracting the two unmodulated frequencies. As the frequencies of the two unmodulated signals become closer together, the wavelength $\lambda_{\Delta f}$ increases, and vice versa.

Here, DFCW module 310 may use equation 4 to provide an estimate of true distance based on a wrapped phase; however, this estimate may not provide a result that is accurate enough for some situations. Specifically, the accuracy of the DFCW calculation depends on the wavelength $\lambda_{\Delta f}$, and thus, there is a tradeoff between the spread of the frequencies used in the DFCW radar and the accuracy of the distance estimate. Moreover, in some embodiments, the bandwidth is limited to only a portion of the RF spectrum. For example, the FCC provides an unlicensed spectrum portion of approximately 150 MHz centered at 5.8 GHz. Thus, the frequency spread for the DFCW signals is maximized if 5.725 Ghz and 5.875 Ghz are selected as the respective frequencies for the two unmodulated frequencies. Subtracting the frequencies to yield $\lambda_{\Delta f}$ means that the wavelength of the resulting periodic signal is 2 meters. If the receiver has an error up to 10% of the wavelength used for ranging, which, in the case of DFCW ranging is the wavelength $\lambda_{\Delta f}$ of the periodic signal generated by subtracting the two unmodulated signals, the DFCW true distance estimate may be off by 0.2 meters (approximately eight inches). In some use cases, especially where the spread of the two unmodulated signals is limited by bandwidth restrictions, DFCW ranging may not provide enough accuracy to identify a particular distance between the RF tag and tag reader. Furthermore, the two unmodulated frequencies may change or frequency hop within the allotted spectrum (as required by the FCC) which may shrink the frequency spread further, thereby increasing the error.

Figure 4:
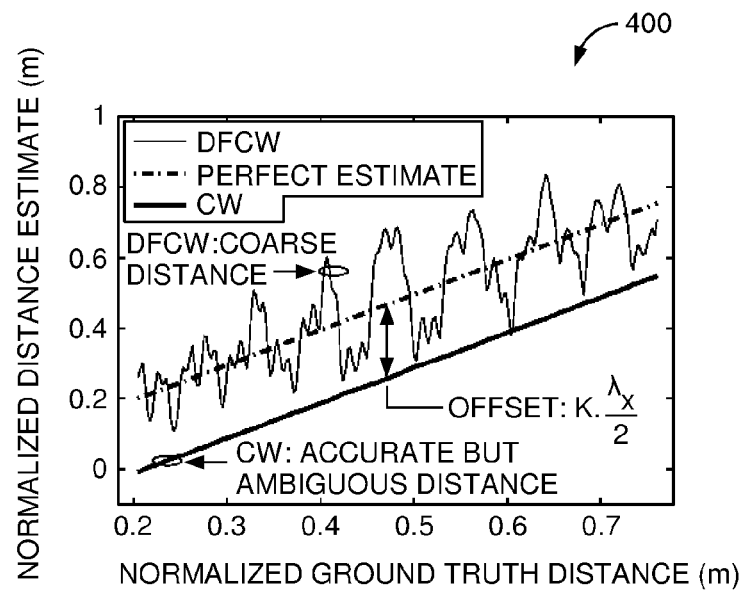
FIG. 4 is a chart illustrating locating a RFID tag based on various continuous wave techniques, according to one embodiment disclosed herein.

FIG. 4 is a chart 400 illustrating locating a RFID tag based on various continuous wave techniques, according to one embodiment disclosed herein. The X axis of chart 400 (i.e., the normalized ground truth distance) is the actual normalized length of the backscatter link while the Y axis (i.e., the normalized distance estimate) is the result provided by the DFCW and CW ranging techniques. As shown, CW ranging provides consistent results—i.e., does not include a widely varying error value—but suffers from cycle ambiguity caused by the wrapped phase. Thus, CW ranging results in a distance that is off from the actual distance of the backscatter link by a constant offset $k \cdot \lambda_x/2$ where k is the integer number of wavelengths traversed by the CW signal and $\lambda_x$ is the wavelength of the frequency for which the cycle ambiguity needs to be resolved (i.e., the frequency of the signal used when performing CW ranging). DFCW ranging, on the other hand, provides a coarse distance estimate that varies widely. However, DFCW ranging does not suffer from the CW cycle ambiguity from a wrapped phase. Accordingly, neither ranging technique, by itself, may produce a reliable distance estimate of the backscatter link.

One solution, as outlined by the article "Accurate Phase-Based Ranging Measurements for Backscatter RFID Tags" in *Antennas and Wireless Propagation Letters, IEEE* (Volume 11, pages 152-155) (2012), which is herein incorporated by reference, combines the DFCW and the CW ranging techniques. By directly combining the two ranging techniques, the DFCW distance measurement may be used to resolve the k value that is unknown in equation 3. Once k is known, the more precise CW ranging technique may be used to determine the separation distance that is more precise than the coarse distance provided from using DFCW alone. However, this direct combining method requires high accuracy from the MFCW radar, i.e., the maximum absolute error must be smaller than $\lambda_x/2$ where $\lambda_x$ is the wavelength of the signal used when performing CW ranging. For example, if the CW ranging frequency is 5.8 GHz, the absolute error value must be smaller than approximately 25 mm. However, as mentioned earlier, performing DFCW with a 150 MHz frequency spread on a receiver with 10% maximum error could result in an error of 200 mm, well above the maximum absolute error required for the direct combining method. Although this issue may be mitigated by using a larger frequency spread or by using more precise receiver hardware, these solutions may be unavailable (in the case of limited assigned bandwidth) or expensive.

Spatial Averaging

Instead of directly combining the CW and DFCW methods shown in equations 3 and 4, the results of the two techniques may be spatial averaged to resolve the CW cycle ambiguity caused by the wrapped phase. Referring again to FIG. 4, the result of CW ranging appears to oscillate, much like a sinusoid, as the distance varies. Thus, although the error from DRFW varies widely, over a large enough spatial sampling, the average error approaches the perfect estimate or the true distance of the backscatter link. Stated differently, spatial averaging DFCW is similar to time averaging a sinusoidal signal where, with sufficient sampling, the average approaches a constant value. In a system where the distance between the RF tag and the received varies—e.g., the RF tag is attached to a wrist of a user who is moving—spatial averaging the results DFCW may reduce the error of DFCW to within a bound such that the correct k for CW may be chosen. Stated differently, as the RF tag or the receiver of the RF tag reader moves, averaging a plurality of results from DFCW ranging approaches a constant value—i.e., mitigates the wide error range shown in the chart 400. If the RF tag moves enough, averaging the DFCW samples measured as the tag moves will decrease the DFCW error below a threshold so that the correct k can be chosen much like how performing time averaging with a sinusoid approaches zero.

Figure 5:
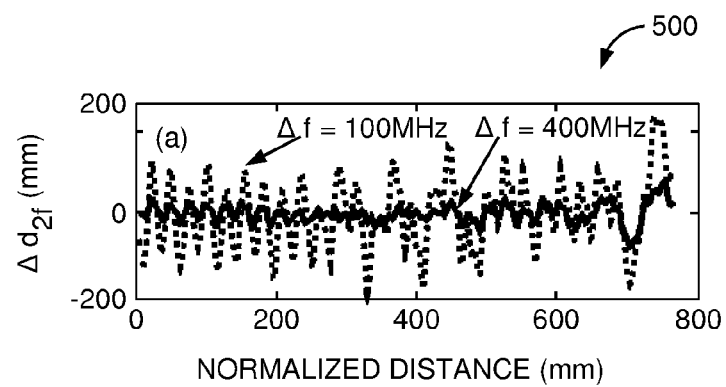
FIG. 5 is a chart illustrating the frequency spreading and accuracy tradeoff in dual-frequency continuous wave radar, according to one embodiment disclosed herein.

FIG. 5 is a chart 500 illustrating the frequency spreading and accuracy tradeoff in dual-frequency continuous wave radar, according to one embodiment disclosed herein. The Y axis on chart 500 is the DFCW error while the X axis is the normalized separation distance between the RF tag and the receiver. Like in FIG. 4, chart 500 shows the periodic nature of DFCW ranging according to the separation distance. Thus, performing DFCW ranging while the separation distance varies and then averaging the results may reduce the error and yield a more reliable estimate of the backscatter link.

Moreover, chart 500 illustrates the effect of the frequency spread of the two unmodulated signals on the error. Using signals that are spread by only 100 MHz (e.g., 5.750 GHz and 5.850 GHz) yields larger error values than signals that are separated by 400 MHz. Accordingly, performing DFCW ranging in narrower bandwidth spectrums leads to a wider, or a more extreme, range of error values.

Figure 6:
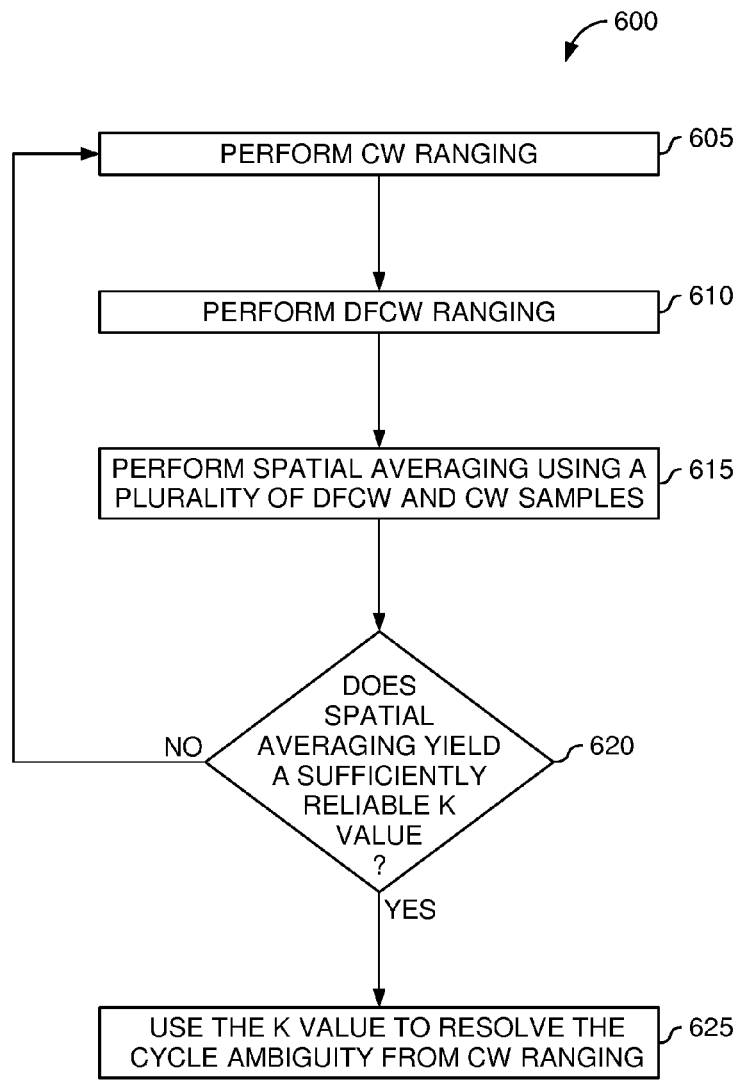
FIG. 6 is a method of performing spatial averaging to identify a distance a signal propagates, according to one embodiment described herein.

FIG. 6 is a method 600 of performing spatial averaging to identify a distance a signal propagates, according to one embodiment described herein. At block 605 a RF tag reader uses a transmitter to propagate an unmodulated signal to a RF tag which in turn either transmits or backscatters a modulated signal to the tag reader's receiver. The RF tag reader may remove the modulation (i.e., the RF tag's ID) and compare the phase of the received signal to the phase of the transmitted signal—e.g., perform CW ranging. Based on this phase difference, the RF tag reader may use equation 2 to determine the distance that corresponds to phase offset caused by the backscatter link. Although CW ranging is very accurate (within millimeters) if a gigahertz signal is used, the measured distance may be offset from the true distance based on a cycle ambiguity. That is, CW ranging calculates the distance based on a wrapped phase which may be off by $k*\lambda/2$ where k is any positive integer.

In addition to performing CW ranging, at step 620 the RF tag reader may perform DFCW ranging (or another suitable type of multi-frequency continuous wave ranging). Instead of using one unmodulated signal, the reader transmits two unmodulated signals either simultaneously or based on a time duplex scheme, which the RF tag then propagates back to the RF tag reader. In another embodiment, the RF tag reader may use the phase measured from the CW signal transmitted in step 605 and only transmit one additional signal in step 610. The RF reader may calculate the phase difference between the two signals as shown in equation 4 which may then be used to provide a coarse estimate of the true distance of the backscatter link which is not dependent on knowing the k value. As shown in FIGS. 4 and 5, however, the error of this estimate varies widely depending on the length of the backscatter link. Moreover, the range of error values grows as the frequency separation of the two signals used in DFCW decreases.

Nonetheless, FIGS. 4 and 5 illustrate that the error associated with DFCW ranging is substantially periodic based on the separation distance between the RF tag and the receiver. Accordingly, in a system where this distance varies, the error may be mitigated by averaging a plurality of measured DFCW estimates.

At block 615, the RF tag reader (or some other computing device coupled to the reader) averages a plurality of DFCW estimates. So long as the distance between receiver and the RF tag varies, averaging the plurality of DFCW estimates taken over time results in a spatial average of the estimates. Although the present disclosure mentions the RF tag moving to enable spatial averaging, in other embodiments the RF receiver, or both the tag and the receiver, may move.

In one embodiment, the RF tag reader uses a minimum mean square error (MMSE) as a searching algorithm to spatially average the data history. Specifically, the MMSE algorithm may use a plurality of DFCW and CW ranging cycles to resolve the cycle ambiguity associated with CW ranging. One example of a MMSE algorithm is given by:

$$\operatorname{argmin}_k\{\sigma^2\} = \operatorname{argmin}_k\left\{\frac{1}{L}\int_0^L \left[d_2 - \hat{d} - k\frac{\lambda_x}{2}\right]^2 ds\right\}. \quad (5)$$

As is typical in MMSE algorithms, the term in the brackets is the error which is calculated by subtracting the measured, estimated distance from the actual distance. Because in practical scenarios the actual distance is not known, given the high accuracy of CW ranging, it is used in place of the actual distance. Thus, the variable $d_{2f}$ is the estimate distance provided by performing equation 4 (i.e., DFCW ranging) while variable $\hat{d}$ is the offset distance provided by equation 2 (i.e., CW ranging). Because the offset distance yielded by performing CW ranging is subject to a cycle ambiguity, the term $$k\frac{\lambda_x}{2}$$

is then used to convert the offset distance $\hat{d}$ to the true distance of the backscatter link. Thus, the term $$\hat{d} - k\frac{\lambda_x}{2}$$

is an acceptable approximation of the actual length of the backscatter link while the entire term $$d_{2f} - \hat{d} - k\frac{\lambda_x}{2}$$

is an approximation of the DFCW error—i.e., the estimated distance provided by DFCW ranging minus the actual distance provided by CW ranging. The error is then squared to ensure that error of each sample is positive.

For each sample provided by DFCW and CW ranging (i.e., a value for $d_{2f}$ and $\hat{d}$), equation 5 identifies the k that yields the smallest error. That is, the RF tag reader plugs in a plurality of different integer k values into equation 5 until the minimum error is found. The 1/L and the integral represent that the MMSE algorithm is repeated, i.e., the minimum error is found, over a plurality a samples (L) and averaged. That is, the tag reader computes distance estimates using DFCW and CW ranging, and uses these measurement to identify the k value that yields the smallest error for each sample. That is, a k value that minimizes the difference between the DFCW and CW range estimates is chosen for each sample (L).

At block 620, the tag reader determines whether the spatial averaging yields a sufficiently reliable k value. As the tag reader continues to gather new samples from DFCW and CW ranging, the DFCW distance may, as shown by FIGS. 4 and 5, vary widely depending on the spatial movement of the RF tag. Accordingly, the k that results in the minimum error may also change. However, because the average of errors approach the actual separation distance, the k value that minimizes the error using the measured DFCW and CW values will also approach the correct k value. To determine when the current k value has sufficiently stabilized to represent the true k value, the tag reader may monitor one or more computational factors associated with performing spatial averaging such as the rate of change of the k value, the standard deviation of from $\sigma^2$ of equation 5, or the time spent performing spatial averaging.

In one embodiment, the tag reader may include logic that monitors the current k value yielded by minimizing the error term found in equation 5. If the k value remains constant for a predefined number of DFCW and CW samples, the logic may indicate that the k value is sufficiently reliable. For example, the logic may be configured such that the k value must remain constant for a plurality of consecutive samples. In another embodiment, the logic may include a time out value where, after a defined time period, the k value is selected as the correct k value.

At block 620, if the tag reader logic determines that spatial averaging yields a sufficiently reliable k value, at block 620 the tag reader uses the k value to resolve the cycle ambiguity from CW ranging. As discussed previously, CW ranging typically yields a very accurate estimate for the distance between the RF tag and the receiving antenna. Thus, once the spatial averaging of the DFCW ranging results yields a reliable k value, this value is inserted into equation 3 to resolve the cycle ambiguity and yield the correct true distance.

Alternatively, the MMSE algorithm could use the current value of k to resolve the cycle ambiguity of CW ranging at each sample. At step 620, if the RF tag reader determines that the k value is sufficiently reliable, then the reader ceases spatial averaging and uses the value of k to resolve the cycle ambiguity of CW ranging from that point on.

In one embodiment, the k value may not be an integer value but non-integer value may be used (e.g., 20.5 wavelengths). Using a non-integer value for k may be advantageous when the spatial averaging algorithm constantly updates the distance estimate. Before enough spatial averaging has taken place for the MMSE algorithm to settle on an integer k value, the distance estimate varies by integer multiples of a half wavelength. Calculating non-integer values for k results in a distance estimate profile that does not contain discrete jumps. Once enough spatial averaging has taken place for the MMSE algorithm to settle on a k value, however, using an integer value of k instead of the non-integer k value may minimize the error.

Figure 7:
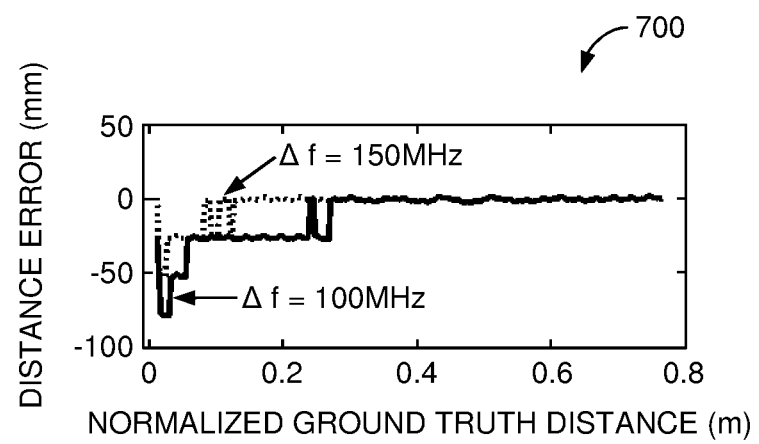
FIG. 7 is a chart illustrating spatial averaging a combined continuous-wave ranging system, according to one embodiment disclosed herein.

FIG. 7 is a chart 700 illustrating spatial averaging a combined continuous wave ranging system, according to one embodiment disclosed herein. Specifically, chart 700 correlates the distance error from using both CW and DFCW ranging techniques to the normalized ground distance. The RF tag and receiver antenna start at some distance apart which is normalized to be zero on the X axis. Until the distance separating the RF tag from the tag reader increases beyond a spatial offset (i.e., the distance from the reference point where the error maintains a zero value), the k value may not have settled to the correct value. Accordingly, the error is a stepwise function where the error is caused by using an incorrect k value in equation 3 to solve for the true distance. After a certain distance change, however, the distance error approaches a zero error. That is, with enough data samples and distance traveled, the k value accurately reflects the number of wavelengths traveled by the propagating signal. Thus, using the MMSE algorithm mitigates the DFCW error as the separation distance between the RF tag and the receiver antenna varies by the spatial offset. Although FIG. 7 illustrates the error approaching zero as the distance between the RF tag and the antenna increases, the same result is achieved (i.e., the error approaches zero) if the distance between the RF tag and the antenna decreases by the spatial offsets shown in chart 700.

In chart 700, the spatial offset needed before the tag reader is able to identify the correct k value depends on the frequency spread of the signals used when performing DFCW, the characteristics of the channel, and the accuracy of the phase measurement device. As shown, increasing the frequency spread increases the accuracy. Thus, the spatial offset decreases. In chart 700, the spatial offset needed for DFCW ranging with a frequency spread of 150 MHz is approximately 0.12 meters from the original point of reference while the spatial offset needed for a frequency spread of 100 MHz is approximately 0.26 meters. So long as the tag reader continues to sample and calculate the k values while the distance between the RF tag and the antenna increases (or decreases) until the spatial offset is reached, then equation 5 yields the correct k value. Once the k value is used to remove the cycle ambiguity resulting from the wrapped phase, equation 3 yields a separation distance that is accurate within millimeters.

Although the current embodiments discuss using a RF tag reader and a RF tag in a RFID system, the current disclosure is not limited to such. For example, spatial averaging DFCW values may be applied to RF systems where a transmitter transmits a signal to a receiver and the receiver identifies the signal and actively transmits a similar signal back to the transmitter. In such a system, the ranging and spatial averaging equations may be modified to account for fact that the signal travels from the transmitter to the receiver, as opposed to traveling from the transmitter to the tag and back to the receiver in a backscatter system. Moreover, the current embodiments may be used in either monostatic mode or bistatic mode. When using bistatic mode, in one embodiment, the separation distance between the transmitter and receiver antennas of the RF tag reader is less than the distance between the RF tag and the RF tag reader.

CONCLUSION

Identifying a distance between a RF tag and a receiver antenna may include combining different ranging techniques. However, different phase-based ranging techniques (e.g., CW and MFCW) come with different advantages and disadvantages. Instead of relying on only one of the ranging techniques, in one embodiment, the CW and MFCW techniques are used in tandem. Specifically, the tag reader may include logic that performs MFCW ranging to determine an estimated distance that can be used to resolve the cycle ambiguity—i.e., determine the unwrapped phase. Once the cycle ambiguity is resolved, the tag reader may use the CW technique to determine the separation distance with high accuracy (e.g., up to millimeter precision).

To perform DFCW ranging, at least two unmodulated, periodic signals are propagated from a transmitter of the RF tag reader to a RF tag. In response, the RF tag transmits additional signals back to the RF tag reader which measures the phase difference between the signals received at each frequency to estimate the separation distance. However, the error of this estimated distance depends on the frequency spread between the two unmodulated signals, with the error decreasing as the frequency spread increases. However, increasing the frequency spread requires additional available bandwidth which may be limited in some cases, thus inhibiting MFCW from being able to accurately resolve the cycle ambiguity.

In one embodiment, the receiver uses spatial averaging to compensate for the limitations of performing DFCW in a bandwidth-limited environment. Although DFCW provides an estimate of the separation distance with errors that vary widely, the error values form a pattern relative to the separation distance. That is, the error values oscillate between maximum and minimum values around the correct separation distance as the separation distance changes. Accordingly, in one embodiment, the receiver uses spatial averaging to average out this oscillating error and provide a more accurate DFCW ranging estimate. In this manner, the receiver may use spatial averaging to lessen the negative effects of performing DFCW ranging in a bandwidth limited environment. The DFCW estimate may then be used to resolve the cycle ambiguity in CW ranging to more accurately identify the separation distance relative to using DFCW or CW ranging alone.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of performing phase-based ranging techniques, comprising:
   outputting at least a first signal for transmission to a radio frequency (RF) tag;
   obtaining at least a second signal from the RF tag;
   estimating a plurality of first distances between the RF tag and an RF tag reader using a continuous-wave (CW) ranging technique based, at least in part, on the first signal and the second signal;
   estimating a plurality of second distances between the RF tag and the RF tag reader using a multi-frequency continuous-wave (MFCW) ranging technique based, at least in part, on the first signal and the second signal; and
   performing spatial averaging based on the pluralities of first and second distances to mitigate the effects of an error associated with the plurality of second distances.

2. The method of claim 1, further comprising:
   determining, based on the spatial averaging, a number of wavelengths traveled by a signal of the CW ranging technique; and
   measuring a distance between the RF tag and the RF tag reader using one of the plurality of first distances and the number of wavelengths.

3. The method of claim 1, wherein the first signal is transmitted from the RF tag reader, wherein the second signal is received at the RF tag reader, and wherein the CW ranging technique comprises measuring a phase difference between the first signal and the second signal.

4. The method of claim 1, further comprising:
   outputting at least a third signal for transmission to the RF tag;
   obtaining at least a fourth signal from the RF tag;
   wherein the first signal and the third signal are transmitted from the RF tag reader, wherein the second signal and the fourth signal are received at the RF tag reader, wherein the MFCW ranging technique comprises:
      measuring a first phase difference between the first signal and the second signal, and
      measuring a second phase difference between the third signal and the fourth signal,
   and wherein the first and second signals include a first frequency and the third and fourth signals include a second frequency.

5. The method of claim 1, wherein, while estimating the first and second plurality of distances, a distance between the RF tag and the RF tag reader varies.

6. The method of claim 1, wherein spatial averaging is performed using a searching algorithm that identifies a number of wavelengths traveled by a signal of the CW ranging technique based on the first and second plurality of distances.

7. The method of claim 1, further comprising:
   determining whether the effects of the error are sufficiently mitigated by evaluating a computational factor associated with spatial averaging, wherein the computational factor indicates whether a previous distance between the RF tag and RF tag reader has changed by a predetermined spatial offset; and
   upon determining that the effects of the error are sufficiently mitigated, measuring the distance between the RF tag and the RF tag reader based on a result of the spatial averaging.

8. The method of claim 1, wherein a frequency of a signal used in the CW ranging technique is the same as a frequency of a signal used in the MFCW ranging technique.

9. A RF tag reader, comprising:
   an antenna;
   a transmitter configured to transmit at least a first signal to an RF tag;
   a receiver configured to receive at least a second signal from the RF tag;
   continuous-wave (CW) logic configured to estimate a plurality of first distances between the RF tag and the antenna using a CW ranging technique based, at least in part, on the first signal and the second signal;
   multi-frequency continuous-wave (MFCW) logic configured to estimate a plurality of second distances between the RF tag and the antenna using a MFCW ranging technique based, at least in part, on the first signal and second signal; and
   spatial averaging logic configured to perform spatial averaging based on the pluralities of first and second distances to mitigate the effects of an error associated with the plurality of second distances.

10. The RF tag reader of claim 9, wherein the spatial averaging logic is configured to determine, based on the spatial averaging, a number of wavelengths traveled by a signal of the CW ranging technique and measure a distance between the RF tag and the antenna using one of the plurality of first distances and the number of wavelengths.

11. The RF tag reader of claim 9, wherein:
   the transmitter is configured to transmit at least a third signal and a fourth signal to the RF tag;
   the receiver is configured to receive at least a fifth signal and a sixth signal from the RF tag;
   the CW ranging technique comprises measuring a phase difference between the first signal and the second signal;
   the MFCW ranging technique comprises:
      measuring a first phase difference between the third signal and the fifth signal and
      measuring a second phase difference between the fourth signal and the sixth signal,
   the third and fifth signals comprise a first frequency and the fourth and sixth signals comprise a second frequency.

12. The RF tag reader of claim 9, wherein, while estimating the pluralities of the first and second distances, the distance between the RF tag and the antenna varies.

13. The RF tag reader of claim 9, wherein the spatial averaging logic is configured to determine whether the effects of the error are sufficiently mitigated by evaluating a computational factor associated with spatial averaging and, upon determining that the effects of the error are sufficiently mitigated, measure the distance between the RF tag and the antenna based on a result of the spatial averaging,
   wherein the computational factor indicates whether a previous distance between the RF tag and antenna has changed by a predetermined spatial offset.

14. The RF tag reader of claim 9, wherein the antenna is used to transmit and receive signals associated with the CW and the MFCW ranging techniques.

15. The RF tag reader of claim 9, further comprising demodulation logic configured to demodulate signals received from the RF tag and correlate the received signals to signals transmitted by the CW and MFCW logics.

16. A RF receiver, comprising:
   an antenna;
   a receiver configured to receive at least a first signal from an RF transmitter;
   continuous-wave (CW) logic configured to estimate a plurality of first distances between the RF transmitter and the antenna using a CW ranging technique based, at least in part, on the first signal;

multi-frequency continuous-wave (MFCW) logic configured to estimate a plurality of second distances between the RF transmitter and the antenna using a MFCW ranging technique based, at least in part, on the first signal; and spatial averaging logic configured to perform spatial averaging based on the pluralities of first and second distances to mitigate the effects of an error associated with the plurality of second distances.

17. The RF receiver of claim 16, wherein the spatial averaging logic is configured to determine, based on the spatial averaging, a number of wavelengths traveled by a signal of the CW ranging technique and measure a distance between the RF transmitter and the antenna using one of the plurality of first distances and the number of wavelengths.

18. The RF receiver of claim 16, wherein:

the receiver is configured to receive at least a second signal and a third signal from the RF transmitter;

the CW ranging technique comprises measuring a phase difference between a fourth signal transmitted from the RF receiver to the RF transmitter and the first signal;

the MFCW ranging technique comprises:

measuring a first phase difference between the fifth signal transmitted from the RF receiver to the RF transmitter and the second signal and measuring a second phase difference between a sixth signal transmitted from the RF receiver to the RF transmitter and the third signal, the second and fifth signals comprise a first frequency and the third and sixth signals comprise a second frequency.

19. The RF receiver of claim 16, wherein the spatial averaging logic is configured to determine whether the effects of the error are sufficiently mitigated by evaluating a computational factor associated with spatial averaging and, upon determining that the effects of the error are sufficiently mitigated, measure the distance between the RF transmitter and the antenna based on a result of the spatial averaging, wherein the computational factor indicates whether a previous distance between the RF transmitter and antenna has changed by a predetermined spatial offset.

20. The RF receiver of claim 16, wherein the antenna is used to transmit and receive signals associated with the CW and the MFCW ranging techniques.

* * * * *